United States Patent [19]

Stewart

[11] 4,312,458
[45] Jan. 26, 1982

[54] REMOVABLE COVER FOR FACEPLATE OF ELECTRICAL SWITCH OR OUTLET

[76] Inventor: Gloria Stewart, 2772 E. 75th St., Unit 5F South, Chicago, Ill. 60649

[21] Appl. No.: 178,872

[22] Filed: Aug. 18, 1980

[51] Int. Cl.³ .............................................. N02G 3/14
[52] U.S. Cl. ................................. 220/241; 150/52 R; 174/66; 174/67; 200/293
[58] Field of Search ............. 220/241, 242; 150/52 R; 174/66, 67; 200/293

[56] References Cited

U.S. PATENT DOCUMENTS

| | | | |
|---|---|---|---|
| 2,022,364 | 11/1935 | Walsh et al. | 220/241 X |
| 2,980,283 | 4/1961 | Bentsen | 220/241 |
| 3,028,467 | 4/1962 | Hubbell | 174/66 X |
| 3,987,928 | 10/1976 | Mori | 220/241 |

Primary Examiner—George T. Hall
Attorney, Agent, or Firm—Stotland, Stratman & Levy Dithmar

[57] ABSTRACT

A removable slipcover for the faceplate of an electrical switch or outlet comprises a sheet of washable decorative fabric folded over and seamed together along the side and bottom edges thereof to form an open-top pouch or pocket for receiving the associated faceplate therein. Openings through the front and back panels of the slipcover are arranged to be respectively substantially congruent with corresponding apertures in the faceplate, each opening being provided with reinforcing stitching around the perimeter thereof. A flap is provided along the upper edge of the front panel of the slipcover and is foldable rearwardly for closing the top of the pouch, and may be stitched along the side edges thereof to the rear panel.

6 Claims, 8 Drawing Figures

U.S. Patent  Jan. 26, 1982  4,312,458
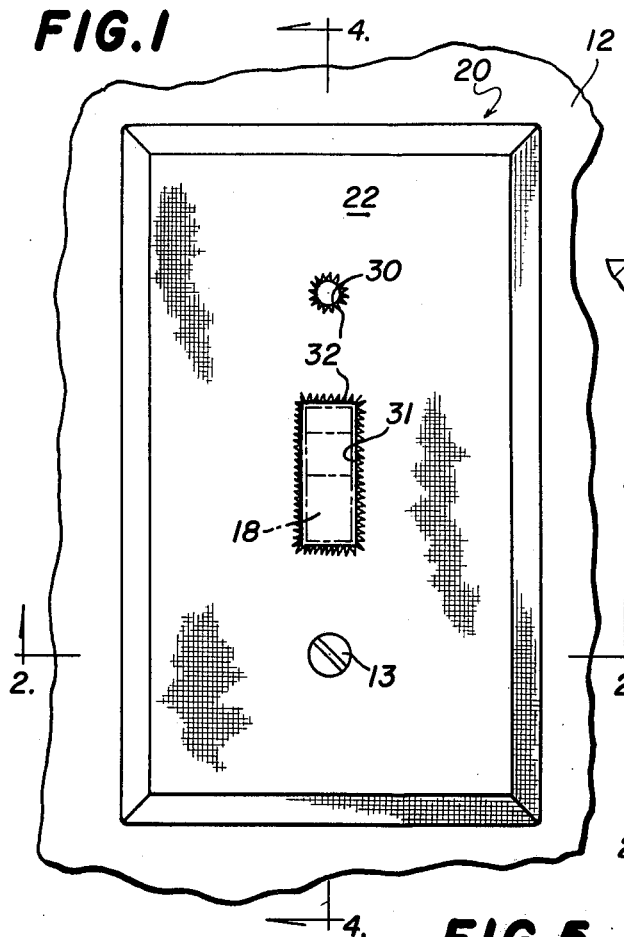
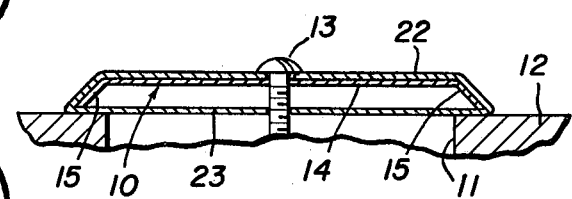
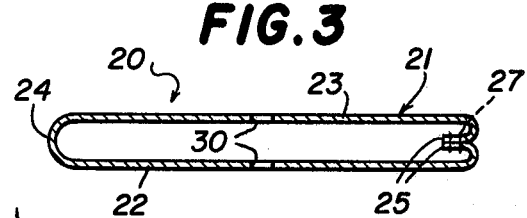
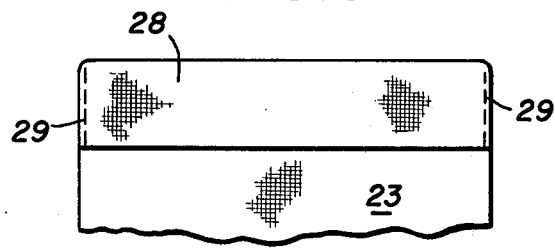
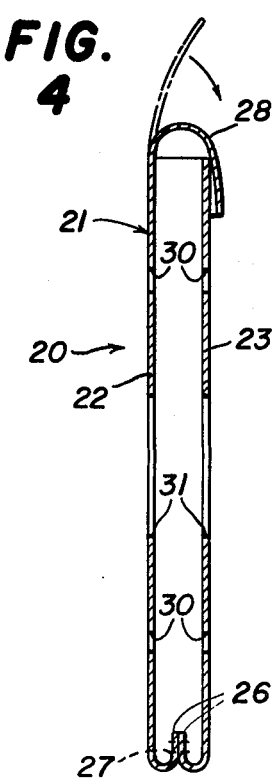
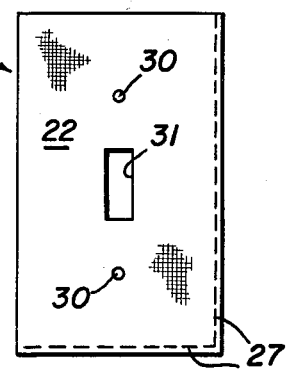
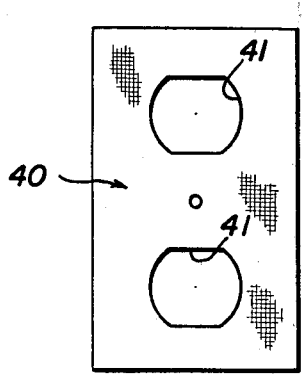
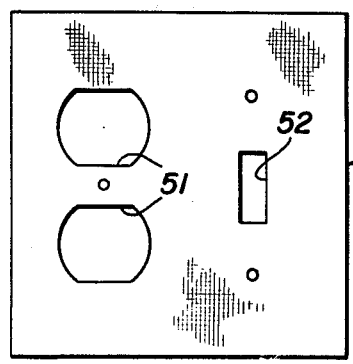

REMOVABLE COVER FOR FACEPLATE OF ELECTRICAL SWITCH OR OUTLET

BACKGROUND OF THE INVENTION

The present invention relates to covers for the faceplates of wall-mounted electrical switches or outlets. Such faceplates are frequently touched by a user's hands in ordinary use and, therefore, become quite dirty after extended use. This creates an unsanitary condition, as well as being unsightly, since the soiled faceplate is usually quite noticeable against the background of the surrounding wall.

It is known to cover such faceplates with wallpaper so that they will match the decor of the surrounding wall, but this type of permanent covering does not solve the soiling problem, since the dirt simply accumulates on the wallpaper cover which is permanently adhesively secured to the faceplate.

SUMMARY OF THE INVENTION

It is therefore, a general object of the present invention to provide a removable, washable cover for the faceplates of wall-mounted electrical switches and outlets, so as to afford a decorative covering and which can be readily cleaned and reused.

In summary, there is provided a removable cover for the faceplate of a wall-mounted electrical switch or outlet wherein the faceplate has apertures therethrough for switch levers and fasteners and the like, the cover comprising a sheet of decorative material covering the outer surface of the associated faceplate, and a rearwardly projecting portion of the sheet adapted to extend around the peripheral edge of the associated faceplate and along the rear surface thereof, the sheet having openings therein respectively substantially congruent with the apertures in the associated faceplate.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages, of the invention.

BRIEF DESCRIPTION OF THE DRAWINGS

FIG. 1 is a front elevational view of a faceplate cover constructed in accordance with and embodying the features of the present invention, and disposed over an associated faceplate;

FIG. 2 is a view in horizontal section taken along the line 2—2 in FIG. 1;

FIG. 3 is a view similar to FIG. 2 of the faceplate cover along, with the faceplate removed therefrom;

FIG. 4 is a view in vertical section, taken along the line 4—4 in FIG. 1, and with the faceplate removed from the covering;

FIG. 5 is a reduced front elevational view of the faceplate cover of the present invention;

FIG. 6 is an enlarged, fragmentary rear elevational view of the top portion of the faceplate cover of FIG. 5;

FIG. 7 is a view similar to FIG. 5 of an alternative form of the faceplate cover of the present invention; and FIG. 8 is a view similar to FIG. 5 of still another form of the faceplate cover of the present invention.

DESCRIPTION OF THE PREFERRED EMBODIMENT

Referring to FIGS. 1 through 6 of the drawings, there is illustrated a cover, generally designated by the numeral 20, constructed in accordance with the present invention and adapted for covering a faceplate 10 of a wall-mounted switch. The faceplate 10 closes an electrical box 11 mounted in a wall 12 and is secured in place by suitable fasteners such as screws 13. The faceplate 10 is substantially rectangular in shape having a main wall 14 provided with inclined marginal flanges 15 around the perimeter thereof. Apertures in the faceplate 10 accommodate the screws 13 and a switch lever 18.

The cover 20 is formed of a sheet 21 of flexible material, preferably fabric, which is folded in half to define a rectangular front panel 22 and a rectangular rear panel 23, interconnected along one edge thereof by a bight portion 24. The free side and bottom edges 25 and 26 of the front and rear panels 22 and 23 are folded inwardly and stitched together along a seam 27 to form an open-top pouch or pocket, as can best be seen in FIGS. 3 and 4. Thus, the seam 27 is completely internal of the pouch, providing a smooth outer surface for the cover 20. In practice, this inturned seam is effected by folding the sheet 21 in half, stitching it along the side and bottom edges and then folding the resulting pouch inside out to arrive at the configuration illustrated in FIGS. 3 and 4.

Referring to FIGS. 4 and 6 of the drawings, the front panel 22 extends upwardly above the upper edge of the rear panel 23 to form a top flap 28 which is foldable rearwardly to close the open-top of the pouch. The side edges of the top flap 28 may be stitched to the rear panel 23 as at 29 to hold the top flap 28 closed. Openings 30 and 31 are formed through the front and rear panels 22 and 23 for accommodating the screws 13 and the switch lever 18, each of these openings being provided with a reinforcing stitching 32, such as a zigzag stitching around the perimeter thereof.

In use, the faceplate 10 is simply inserted into the open top of the cover 20 so that the front and rear surfaces of the faceplate 10 respectively face the front and rear panels 22 and 23 of the cover 20. In the event that the side edges of the top flap 28 are stitched to the rear panel 23, as in FIG. 6, the flexibility and resilience of the material will be such as to permit lifting of the flap sufficiently to permit insertion of the faceplate 10. It will be noted that the openings 30 and 31 are arranged to be respectively congruent with the corresponding apertures in the faceplate 10 to accommodate passage therethrough of the screws 13 and the switch lever 18.

Preferably, the cover 20 is formed of a washable fabric material. Thus, it will be appreciated that when it becomes dirty, it can be easily removed and then simply included in the household laundry. It wil also be appreciated that the present invention provides a decorative cover for the faceplate 10, and that this cover can match or be coordinated with the other fabric materials in the room, such as those in the draperies, upholstery, bedclothes and the like.

In FIG. 7 there is illustrated an alternative form of cover, generally designated by the numeral 40, having two openings 41 therein for accommodating electrical outlet sockets, the cover 40 being adapted for use with a faceplate of a two-socket electrical outlet. Similarly, FIG. 8 illustrates still another form of cover, generally designated by the numeral 50, for use with a faceplate of a two-socket, single-switch electrical fixture, the cover 50 being provided with openings 51 and 52 for respectively accommodating the outlet sockets and the switch lever. It will be understood that the cover of the present invention could be provided in any desired size or shape to accommodate still other types of faceplates.

What has been described, therefore, is a novel decorative cover for an electrical fixture faceplate which is readily removable and washable.

What is claimed is:

1. A removable cover for the faceplate of a wall-mounted electrical switch or outlet wherein the faceplate has apertures therethrough for switch levers and fasteners and the like, said cover comprising a decorative fabric pouch having front and rear panels and four edges, three of said edges being permanently closed, a flap which is foldable rearwardly to close the open edge of the pouch, said front panel covering the outer surface of the associated faceplate, said rear panel covering the opposite surface of the associated faceplate, said panels having openings therein respectively substantially congruent with the apertures in the associated faceplate.

2. The cover of claim 1, wherein said panels are provided with reinforcing stitching around the perimeter of each of said openings.

3. A removable cover for the faceplate of a wall-mounted electrical switch or outlet wherein the faceplate has apertures therethrough for switch levers and fasteners and the like, said cover comprising a sheet of decorative fabric covering the outer surface of the associated faceplate, and a rearwardly projecting portion on said sheet adapted to extend around the peripheral edge of the associated faceplate and along the rear surface thereof, said sheet having openings therein respectively substantially congruent with the apertures in the associated faceplate, said sheet being folded in half to define front and rear panels, said front and rear panels being stitched together along the free side and bottom edges thereof to form an open-top pouch for receiving the associated faceplate therein.

4. The cover of claim 3, wherein the stitched-together edges of said front and rear panels are folded inwardly of the pouch.

5. The covering of claim 3, wherein said front panel extends upwardly above the upper edge of said rear panel to form a flap which is foldable rearwardly to close the open-top of the pouch.

6. The covering of claim 5, wherein the side edges of said flap are stitched to the upper portion of said rear panel.

* * * * *